United States Patent [19]

Smink

[11] 4,148,891
[45] Apr. 10, 1979

[54] ANTIFUNGAL PREPARATIONS

[75] Inventor: Dirk A. Smink, Leiderdorp, Netherlands

[73] Assignee: Gist-Brocades N.V., Delf, Netherlands

[21] Appl. No.: 883,681

[22] Filed: Mar. 6, 1978

Related U.S. Application Data

[63] Continuation of Ser. No. 742,659, Nov. 17, 1976, abandoned, which is a continuation of Ser. No. 590,045, Jun. 25, 1975, abandoned.

[30] Foreign Application Priority Data

Jul. 3, 1974 [GB] United Kingdom .............. 29503/74
Feb. 14, 1975 [GB] United Kingdom .............. 06450/75

[51] Int. Cl.$^2$ ........................ A01N 9/00; A61K 35/74
[52] U.S. Cl. ..................................... 424/181; 424/121
[58] Field of Search .............. 424/115, 180, 181, 121

[56] References Cited

PUBLICATIONS

Schaffner et al., Journal of Antibiotics, vol. 25 #4 (1972), pp. 259-260.
Chemical Abstracts, vol. 72 (1970), p. 108240d.
Gregory, "Uses & Applications of Chemicals & Related Materials", (1939), p. 4, Reinhold Pub. Co.

*Primary Examiner*—V. D. Turner
*Attorney, Agent, or Firm*—Hammond & Littell

[57] ABSTRACT

An antifungal preparation to be used in and on agricultural products such as fruit, vegetables, tubers, root-tubers, flower bulbs and rootstocks comprising an amount of polyene antibiotic, peferably natamycin, effective to prevent or inhibit mold growth on the agricultural products dissolved in a mixture of a lower alkanol, such as ethyl alcohol, and a lower alkanoic acid, such as acetic acid and agricultural products treated with this preparation and the method of treatment by submerging the agricultural products in the preparation or by pasting or spraying the preparation onto the agricultural products.

26 Claims, No Drawings

ANTIFUNGAL PREPARATIONS

PRIOR APPLICATION

This application is a continuation of my copending application Ser. No. 742,659 filed Nov. 17, 1976, now abandoned, which in turn is a continuation of my copending, application Ser. No. 590,045 filed June 25, 1975, now abandoned.

STATE OF THE ART

Citrus fruit, especially oranges, but also lemons and grape fruits and others, are exported in large quantities from the countries in which they are grown to many other countries. This entails transportation over prolonged periods of time under all sorts of conditions and circumstances, a good many of which are inducive to the spoilage of the fruit by mold growth. Furthermore, the fruit is often stored for prolonged periods before it reaches the consumer, which also favors conditions for mold growth to appear.

To avoid deterioration, the citrus fruit is therefore generally treated with an antifungal agent before it is transported. However, notwithstanding treatment of the citrus fruit with an antifungal agent (or fungicide), mold growth often still occurs to such an extent that a considerable part of the citrus fruit cannot be sold when it reaches the country of destination, and one orange, for example, attacked by mold growth is often capable of deleteriously affecting all surrounding fruits.

It has already been discovered that natamycin (pimaricin, cf. Merck Index, 8th Ed. (1968), page 834) is a very active antifungal agent. For the treatment of citrus fruit, however, it is necessary to introduce sufficient amounts of natamycin into the peel of the citrus fruit, especially when the infection has taken place several days before treatment as is usually the case. The use of a suspension of natamycin in water gives insufficient penetration into the peel of the citrus fruits and thus insufficient protection against mole growth. It has been found that by prolonging the immersion times of the fruit to at least one hour, the anti-mold effect of natamycin could be increased, but this practice is, however, highly unpractical and uneconomical. On the other hand, it has been found that a solution of natamycin in dimethylsulfoxide (DMSO) does show the desired action against mold growth, but the shell of DMSO is so penetrating that this solution is unsuitable for practical use. It has also been found that the methyl ester of natamycin, adducted with undecylenic acid, shows some improved effect, but still the penetration into the peel of the citrus fruit - apparently due to an unfavorable hydrophylic-lipophylic balance, is insufficient for practical use.

OBJECTS OF THE INVENTION

It is an object of the invention to provide novel antifungal compositions for treatment of agricultural products for protection against mold.

It is a further object of the invention to provide a novel method of protecting agricultural products from mold.

It is another object of the invention to provide novel agricultural products protected from mold attack.

These and other objects and advantages of the invention will become obvious from the following detailed description.

THE INVENTION

It has now been found that a highly useful and effective preparation can be obtained by combination of natamycin, or another polyene antibiotic, with an alcohol and an organic acid. In these compositions, the solubility of natamycin or other polyene antibiotic is sufficient to penetrate the peel of the citrus fruit to such an extent that mold growth is inhibited virtually completely even during prolonged periods of transportation and storage that are sometimes unavoidable. Furthermore, if a citrus fruit happens to be attacked by mold growth, the sporulation is so strongly inhibited that the mold growth occurs only locally without the risk that whole boxes of citrus fruit are attacked by mold growth.

It has, moreover, been found that the above compositions can also be applied to other agricultural products such as other fruits, vegetables, tubers, root-tubers, flower bulbs and rootstocks with similar advantages. As with citrus fruit the penetration into the peel or outer skin of other agricultural products is markedly better than with the compositions indicated above.

The present invention accordingly provides a preparation for the treatment of agricultural products such as fruit, vegetables, tubers, root-tubers, flower bulbs and rootstocks, comprising an amount of a polyene antibiotic effective to prevent or inhibit mold growth on the agricultural products dissolved in a mixture of a lower alkanol and a lower alkanoic acid.

Suitable examples of polyene antibiotics are natamycin (pimaricin), aureofungin and lucensomycin, or salts or esters thereof, but a preferred example is natamycin. This latter antibiotic can be used in the form of a salt such as alkali metal and alkaline earth metal salts such as sodium salt, or ester, such as methyl ester and lower alkyl esters. Natamycin dissolves to an extent of 500 to 1000 ppm in a mixture of a lower alkanol and a lower alkanoic acid, and such a combination is sufficient for the treatment of agricultural products such as fruit, vegetables, tubers, root-tubers, flower bulbs and rootstocks in order to inhibit mold growth to a high extent and over prolonged periods.

It is to be understood that the term "lower" as applied herein to alkanols and alkanoic acids means that the alkanol or acid contains 1 to 8 carbon atoms, preferably 2 or 3 carbon atoms; the carbon atoms may be arranged in a straight- or branched-chain. The alkanol may contain up to one hydroxy grou per carbon atom, and preferably contains one hydroxy group in the molecule. Preferred alkanols are methyl, ethyl and propyl alcohols. The alkanoic acid may contain 1 or 2 carboxy groups. Preferred alkanoic acids are acetic and propionic acids. The alkanoic acid may contain substitutents such as one or two hydroxy groups, such as lactic acid, and/or one or more halogen atoms, preferably chlorine atoms, such as chloroacetic acid and trichloroacetic acid. Other more complicated acids may also be used, such as citric acid and ascorbic acid. It will be apparent that, when the agricultural products are intended for human consumption, those alkanols and organic acids should be employed which do not leave residues on the agricultural products which are harmful and/or disagreeable when the products are consumed.

The preparations according to the invention preferably contain about 10% to 99.9% of the alkanol (for practical reasons preferably 15% to 50% of alkanol), and preferably about 0.05% to 5% of the alkanoic acid, more preferably 0.5% to 1.5% of alkanoic acid. The preparations may also contain water and additional materials such as coating components, such as plastic emulsions such as polyvinyl acetate emulsions, antioxidants, such as ascorbic acids, wetting agents, and thickeners such as gelatin.

As the antibiotic, natamycin is preferably used. It is used, for example, in amounts of about 0.05% to 0.5%, preferably 0.1% to 0.2%, of the preparation.

Examples of agricultural products that may be treated with preparations of this invention are fruits such as citrus fruits, such as oranges, lemons and grape fruits, other fruits such as bananas, avocados, papayas, mangos, lychees, melons, apples, pears, prunes, cherries, peaches, grapes, tomatoes and cucumbers, vegetables such as cabbage and French celery, tubers such as potatoes, sweet potatoes, turnips, celeriac, turnip radishes, onions and dahlias, root-tubers such as carrots and beet (sugar, mangold) roots, flowers bulbs such as tulip bulbs, narcissus bulbs, crocus corms, gladiolus bulbs, hyacinthus bulbs and iris bulbs, and rootstocks such as cane sugar.

The preparations according to the invention may be used as a bath for submerging the argicultural products. Short submersion periods, preferably 1 to 10 minutes, more preferably 1.5 to 3 minutes, are fully adequate to impart to the agricultural products a lasting protection against mold growth. The agricultural products may be submerged directly in the solution. According to another method, the preparations may be applied to the agricultural products by pasting with brushes, for example rotating brushes are arranged in a somewhat slant plane and the agricultural products are made to travel over the rotating brushes. The brushes are wetted, for example, by rotation through the surface of the preparation. According to still another method, the preparations may be sprayed onto the agricultural products.

The preparations according to the invention may easily be prepared by dissolving the polyene antibiotic, for example natamycin, in the lower alkanol and the lower alkanoic acid by usual methods. The process for their preparation forms another aspect of the invention.

According to a still further aspect of the invention, there is provided a method for applying the preparation as indicated above to agricultural products. The preparations may be applied to the agricultural products by submerging the products in the preparations or by brushing or spraying.

In the following examples there are described several preferred embodiments to illustrate the invention. However, it should be understood that the invention is not intended to be limited to the specific embodiments.

EXAMPLE 1

The peels of oranges were scratched and the oranges were dipped into a suspension of about 150,000 mold spores per ml which were mixed spores of *Penicillium digitatum* and *P. italicum*, molds which usually occur on oranges, for a period of 15 seconds, and the oranges were then dried overnight. The thus infected oranges were dipped for 2 minutes into the solutions indicated hereafter, and stored for 7 days at a temperature of 26° C. and a relative humidity of 95%. For each test, 10 oranges were used, while another 10 untreated but infected oranges were used as a control. The results are reported in Table I.

TABLE I

| Treatment solution | Number attacked by mold growth |
|---|---|
| control | 10 |
| methyl alcohol + 0.1% lactic acid + 0.1% natamycin | 1 |
| water + 0.1% lactic-acid + 0.1% natamycin | 6 |
| water + 0.1% Mertect 340 [2,4-thiazolyl-benzimidazole, also called thiobendazole or TBZ] | 6 |

It is evident from Table I that the best inhibition is obtained by the natamycin solution in the alcohol and the organic acid.

EXAMPLE 2

In this Example, so-called "Jaffa" oranges were used and inoculated in the same manner as indicated in Example 1, except that a spore suspension of 120,000 spores per ml was used. The storage conditions were also the same as in Example 1 and results are reported in Table II.

TABLE II

| Treatment solution | Number attacked by mold growth |
|---|---|
| control | 10 |
| methyl alcohol + 0.1% lactic acid + 0.1% natamycin | 0 |
| ethyl alcohol + 0.1% lactic acid + 0.1% natamycin | 1 |
| n-propyl alcohol + 0.1% lactic acid + 0.1% natamycin | 1 |
| methyl alcohol + 0.1% acetic acid + 0.1% natamycin | 0 |
| methyl alcohol + 0.1% propionic acid + 0.1% natamycin | 0 |
| water + 0.1% Mertect 340 | 8 |

The results of Table II show that good mold protection is obtained by the use of several different alcohols and several different acids.

EXAMPLE 3

In this Example, Jaffa oranges were used and inoculated in the same manner as indicated in Example 1. The storage conditions were also those of Example 1, except that the storage period was 8 days. The results obtained are reported in Table III.

TABLE III

| Treatment solution | Number attacked by mold growth |
|---|---|
| control | 8 |
| ethyl alcohol-water (1:1) + 0.1% acetic acid + 0.1% natamycin | 6 |
| ethyl alcohol-water (1:1) + 0.5% acetic acid + 0.1% natamycin | 3 |
| ethyl alcohol-water (1:1) + 1.0% acetic acid + 0.1% natamycin | 2 |

The results of Table III show that a better mold growth inhibition is obtained by increasing concentration of acid.

EXAMPLE 4

In this Example, a dip treatment was compared with brush treatment. Oranges were inoculated as indicated in Example 1 except that spore suspension of 120,000 spores per ml was used. The storage conditions were the same as in Example 1 except that the storage period was 10 days. For each test, 20 oranges were used and the results are reported in Table IV.

TABLE IV

| Treatment solution | Number attached by mold growth |
|---|---|
| control | 13 |
| dipped for 2 minutes in ethyl alcohol-water (1:1) + 1% acetic acid + 0.1% natamycin | 2 |
| brushed with ethyl alcohol-water (1:1) + 1% acetic acid + 0.2% natamycin* | 2 |
| brushed with water + 0.2% Mertect 340* | 8 |

*these solutions contained also 10% of polyvinyl acetate solutions.

Table IV shows that the brushing treatment gives the same result as the dip treatment when a double amount of the antibiotic is used for the brushng treatment. Further, the result with the preparations of the invention give markedly better results than the known Mertect preparation in the same concentration.

EXAMPLE 5

Untreated lemons were scratched and dipped in a suspension of about 900,000 spores per ml for a period of 15 seconds. The lemons were dried overnight and the dried lemons were brushed with the preparations indicated below. The storage conditions were the same as in Example 1 except that the storage period was 17 days instead of 7 days.

TABLE V

| Treatment solution | Number attacked by mold growth |
|---|---|
| 30% ethyl alcohol + 1% acetic acid + 10% polyvinylacetate | 7 |
| idem + 0.2% natamycin | 2 |
| idem + 0.2% aureofungin | 1 |
| idem + 0.2% lucensomycin | 2 |

Table V shows that the polyene antibiotics indicated give a good protection against mold growth.

EXAMPLE 6

"Hands" of freshly harvested bananas were washed in running water and dried. Then, the bananas were treated with the preparations indicated in Table VI by dipping for about 15 seconds, draining and packing into cartons after drying. The cartons were kept at a temperature of 12.5° C. for 14 days and then ripened for 7 days. The degree of stem rot occurring on each hand was rated as zero (no fungal attack) or from 1 to 4, indicated progressively increasing degrees of fungal attack. Six boxes containing eight hands each were used for each treatment.

TABLE VI

| Treatment solution | Percentage of fungal rot | |
|---|---|---|
| | Cushions | Finger stalk |
| water | 46 | 22 |
| 30% ethyl alcohol + 0.5% acetic acid + distilled water up to 100% | 44 | 23 |
| 30% ethyl alcohol + 0.5% acetic acid + 0.2% natamycin + distilled water up to 100% | 8 | 7 |
| water + 0.2% natamycin | 34 | 18 |

Table VI shows a clear improvement of mold inhibition by the use of the alcohol and the organic acid in the preparation.

EXAMPLE 7

Oranges were scratched and dipped in a suspension of 500,000 spores per ml for a period of 15 seconds. The infected oranges were dried overnight and then the oranges were brushed with the solutions indicated in Table VII and were stored for 6 weeks at 18° C. and a relative humidity of 95%. For each test 14 oranges were used. The results are reported in Table VII.

TABLE VII

| Treatment solution | Number of decayed fruit |
|---|---|
| control | 12 |
| propanol-water (3:7 v/v) + 1% gelatin + 1% acetic acid | 10 |
| propanol-water (3:7 v/v) + 1% gelatin + 1% acetic acid + 0.2% natamycin | 0 |
| propanol-water (2:8 v/v) + 1% gelatin + 1% acetic acid | 11 |
| propanol-water (2:8 v/v) + 1% gelatin + 0.2% natamycin + 1% acetic acid | 2 |
| 0.2% Mertect 340 | 12 |
| 0.2% natamycin in water | 13 |

Table VII shows that good results are obtained even after prolonged storage periods when the antifungal preparations containing alcohol and organic acid are used.

EXAMPLE 8

Disinfection of potatoes

A. Potatoes infected with Rhizoctonia solani were left in the dark at room temperature to sprout. The sprouts were bored out of the potatoes with a cork borer and, and, after drying, the pieces were dipped in molten paraffin to protect the outside of the pieces. Then, 50 pieces were treated for 30 minutes in the disinfection solutions as indicated in Table VIII. After treatment, the pieces were dried and planted in sterile soil. The sprouts were left to grow for a period of 21 days at 20° C. and 90° to 95% relative humidity. After that period, the sprouts were examined for early affection (sprouts completely rotten) and late affection (sprouts with mycelium and/or small brown lesions). The results are in Table VIII.

TABLE VIII

| % suspended or dissolved in water: | | | % sprouts affected | | |
|---|---|---|---|---|---|
| natamycin | ethyl alcohol | acetic acid | early | late | unaffected |
| 0.1 | 50 | 0.1 | 2 | 8 | 84 |
| — | 50 | 0.1 | 24 | 60 | 14 |
| — | — | — | 54 | 30 | 16 |
| 0.1 | — | — | 18 | 42 | 40 |

Table VIII shows that disinfection of potatoes with natamycin in the presence of ethyl alcohol and acetic acid is markedly better than with natamycin alone.

B. Sclerotia, which were cut out of potatoes infected with Rhizoctonia solani, were used for this experiment. 100 mg of the sclerotia were suspended for 2 minutes in solutions as indicated in Table IX and then were filtered on cotton and dried. Three days later, the sclerotia were put on petridishes with a layer of water-agar so that each petri-disc contained 25 pieces of large sclerotia and 25 pieces of small (by cutting up the large pieces) sclerotia. The petri-dishes were observed 21 days later, and the amount of sclerotia showing outgrowth of lyphae of Rhizoctonia were counted and the results are in Table IX.

TABLE IX

| % aqueous suspension or solution | | | number of living sclerotia | |
|---|---|---|---|---|
| natamycin | ethyl alcohol | acetic acid | large | small |
| 0.2 | 50 | 0.1 | 0 | 0 |
| 0.2 | 10 | 0.1 | 0 | 0 |
| 0.2 | — | 0.1 | 3 | 7 |
| untreated | | | 23 | 23 |

Table IX shows that the combination of natamycin with ethyl alcohol and acetic acid is better than the combination of natamycin with acetic acid alone.

C. In another test, potatoes were submerged for 5 minutes at 12° C. in the disinfection formulations indicated in Table X. Thereafter, the potatoes (Sientje) were dried and allowed to sprout for a period of 7 days at 25° C. Then, the potatoes were planted in glass beakers containing moist fine sand and kept for three weeks at 140° C. The moisture content of the sand was 20%. After three weeks, each of the potatoes was examined for the presence of mycelium on the peel and on the sprouts and for the presence of the characteristic brown lesions for Rhizoctonia.

As test disinfectants there were used some natamycin formulations, one crude crystal form of natamycin and a product called AArdisan (based on ethyl mercury bromide). Each test group contained 15 heavily infected potatoes and a potato showing one sprout with lesions or with mycelium was considered not to be disinfected. The results are in Table X.

TABLE X

| % of the following components (in water) | | | | | kind of growth | | number not |
|---|---|---|---|---|---|---|---|
| | alcohol | | acetic | | | | |
| natamycin | ethyl | propyl | acid | AArdisan | mycelium | lesions | disinfected |
| — | — | — | — | — | 15 | 11 | 15 |
| — | 10 | — | 0.1 | — | 15 | 6 | 15 |
| 0.1 (i) | 10 | — | 0.1 | — | 6 | 5 | 6 |
| 0.2 (i) | 10 | — | 0.1 | — | 2 | 1 | 2 |
| 0.2 (ii) | 10 | — | 0.1 | — | 0 | 0 | 0 |
| — | — | — | — | 0.3 | 0 | 0 | 0 |
| — | — | 10 | 0.1 | — | 14 | 7 | 14 |
| 0.1 (i) | — | 10 | 0.1 | — | 1 | 0 | 1 |
| 0.2 (i) | — | 10 | 0.1 | — | 1 | 0 | 1 |

(i) purified natamycin
(ii) crude crystals of natamycin

Table X shows that formulation of 0.2% of natamycin, in combination with alcohol and acetic acid, has a disinfecting power against Rhizoctonia solani which is at least comparable to a standard treatment with a known formulation. The standard treatment used in this test, however, contains a mercury compound and such formulations are preferably avoided because of their toxicity. There is a small indication that propyl alcohol is somewhat better than ethyl alcohol.

EXAMPLE 9

Iris bulbs called Prof. Blaauw, size 10, were used for this experiment. One experiment was performed in a greenhouse and another experiment was performed out of doors.

For the green-house experiment, the bulbs were inoculated in a suspension containing $1.8 \times 10^5$ germs of Fusarium oxysporum iris per ml and one control group was not inoculated. Disinfection was carried out during 20 minutes in a 10 liter tank containing disinfection liquids indicated in Table XI. After disinfection, the bulbs were put in small bags and dried in the surrounding air at 17° C. and 60% relative humidity for a period of 11 days. After drying, the bulbs were planted in a green-house and the soil temperature was 18 to 21° C. Before flower setting, the bulbs were inspected for Fusarium attack and the results are in Table XI.

TABLE XI

| | % suspended or dissolved in water: | | | | | |
|---|---|---|---|---|---|---|
| Group | nata-mycin | strepto-mycin | ethyl alcohol | acetic acid | Benlate (1) | bulbs attacked |
| A | 0.04 | 0.008 | — | — | — | 42 |
| B | 0.04 | 0.008 | 20 | 0.1 | — | 8 |
| C | — | — | — | — | 0.2 | 30 |
| D | — | — | — | — | — | 309 |
| E | not inoculated, not disinfected | | | | | 9 |

(1) a wettable powder containing 50% methyl-butylcarbamoylbenzimidazolyl-carbamate.

In the disinfection liquids some streptomycin was present in the form of its sulfate to avoid bacteria infection.

In the out of doors experiment, the bulbs were treated in a similar manner except that the inoculation suspension contained $1.5 \times 10^5$ germs per ml. The temperature of the soil in which the bulbs were planted out of doors was 14° to 17° C. The results are indicated in Table XII.

TABLE XII

| | % suspended or dissolved in water: | | | | | | |
|---|---|---|---|---|---|---|---|
| Group | nata-mycin | strepto-mycin | TMTD (2) | ethyl alcohol | acetic acid | Benlate | bulbs attacked |
| A | 0.04 | 0.008 | 0.3 | — | — | — | 17 |
| B | 0.04 | 0.008 | 0.3 | 20 | 0.1 | — | 4 |
| C | — | — | 0.3 | — | — | 0.2 | 10 |
| D | — | — | 0.3 | — | — | — | 168 |
| E | not inoculated, not disinfected | | | | | | 0 |

(2) a wettable formulation of tetramethyl thiuram disulfide, added to avoid pythium infection.

Tables XI and XII show that formulations B of the invention are markedly better than natamycin formulations without ethyl alcohol and acetic acid (formulations A) and are even better than Benlate which is another formulation often used for flower bulb disinfection.

In this specification the percentage figures given are generally volume/volume except when the percentage figure is in relation to natamycin or other polyene antibiotic in which case it is weight/volume.

Various modifications of the compositions and methods of the invention may be made without departing from the spirit or scope thereof and it is to be understood that the invention is to be limited only as defined in the appended claims.

I claim:

1. An antifungel composition for use on agricultural products comprising 0.05 to about 0.5% by weight of a polyene antibiotic selected from the group consisting of natamycin, aureofungin, lucensomycin and the alkali metal salts, alkaline earth metal salts or lower alkyl esters thereof to prevent or inhibit mold growth on the agricultural products dissolved in a mixture of 10 to 99% by weight of a lower alkanol and 0.05 to 5% by weight of a lower alkanoic acid.

2. A composition of claim 1 wherein the lower alkanol and the lower alkanoic acid contain 1 to 8 carbon atoms which may be straight or branched chain.

3. A composition of claim 1 wherein the alkanol contains up to one hydroxy group per carbon atom in the molecule.

4. A composition of claim 1 wherein the alkanol is selected from the group consisting of methyl alcohol, ethyl alcohol, and propyl alcohol.

5. A composition of claim 1 wherein the alkanol is ethyl alcohol.

6. A composition of claim 1 wherein the alkanoic acid contains 1 to 2 carboxyl groups and up to 2 hydroxy groups.

7. A composition of claim 1 wherein the alkanoic acid contains at least 1 halogen.

8. A composition of claim 1 wherein the alkanoic acid is selected from the group consisting of acetic acid, propionic acid, lactic acid, citric acid, ascorbic acid, chloroacetic acid and trichloroacetic acid.

9. A composition of claim 1 wherein the alkanoic acid is acetic acid.

10. A composition of claim 1 containing at least one member selected from the group consisting of water, a coating component, an antioxidant, a wetting agent and a thickener.

11. A composition of claim 1 wherein the polyene antibiotic is natamycin or its alkali metal and alkaline earth metal salts and its lower alkyl ester.

12. A composition of claim 1 wherein the antibiotic is selected from the group consisting of natamycin and aureofungin.

13. A method of protecting agricultural products from fungal attack comprising contacting the outer surface of the agricultural products to be protected with a composition of claim 1 for a time sufficient for protection.

14. The method of claim 13 wherein the lower alkanol and the lower alkanoic acid contain 1 to 8 carbon atoms in a straight or branched chain.

15. The method of claim 13 wherein the alkanol contains up to one hydroxy group per carbon atoms in the molecule.

16. The method of claim 13 wherein the alkanol is methyl alcohol, ethyl alcohol, or propyl alcohol.

17. The method of claim 13 wherein the alkanol is ethyl alcohol.

18. The method of claim 13 wherein the alkanoic acid contains one to two carboxyl groups and up to two hydroxy groups.

19. The method of claim 13 wherein the alkanoic acid contains at least one halogen.

20. The method of claim 13 wherein the alkanoic acid is acetic acid, propionic acid, lactic acid, citric acid, ascorbic acid, chloroacetic acid or trichloroacetic acid.

21. The method of claim 13 wherein the alkanoic acid is acetic acid.

22. The method of claim 13 wherein the composition contains at least one member of the group consisting of coating components, an antioxidant, a wetting agent, and a thickener.

23. The method of claim 13 wherein the agricultural products are fruit, vegetables, tubers, root-tubers, flower bulbs or rootstocks.

24. The method of claim 13 wherein the products are submerged for periods of about 1 to 10 minutes.

25. The method of claim 13 wherein the polyene antibiiotic is natamycin or its alkali metal or alkaline earth metal salts and its lower alkyl ester.

26. Agricultural products protected against mold by the method of claim 13.

* * * * *